(No Model.)

A. J. WRIGHT.
FLOAT.

No. 450,857. Patented Apr. 21, 1891.

WITNESSES
M. B. Vorce.
L. R. Vorce.

INVENTOR
Allen J. Wright
by C. M. Vorce
ATTORNEY

UNITED STATES PATENT OFFICE.

ALLEN J. WRIGHT, OF CLEVELAND, OHIO.

FLOAT.

SPECIFICATION forming part of Letters Patent No. 450,857, dated April 21, 1891.

Application filed August 6, 1890. Serial No. 361,215. (No model.)

*To all whom it may concern:*

Be it known that I, ALLEN J. WRIGHT, a citizen of the United States, residing at Cleveland, in the county of Cuyahoga and State of Ohio, have invented certain new and useful Improvements in Floats; and I do hereby declare the following to be a full, clear, and exact description of the invention, such as will enable others skilled in the art to which it appertains to make and use the same.

My invention relates to the construction of hollow metallic floats for use in boilers, steam-traps, and other boiler appliances, oil and chemical tanks, &c., either with or without steam or other pressure; and it consists in the improved method of joining the parts, whereby a tight joint, which is absolutely necessary, and a light float, which is an essential feature, can be made with sufficient strength, greater durability, and less cost of construction than has heretofore been obtained.

Figure 1:
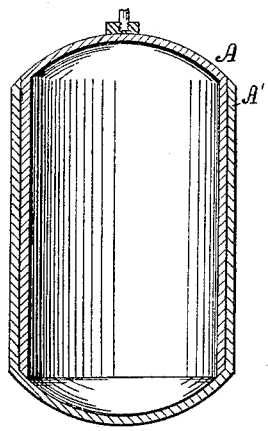
Figure 2:
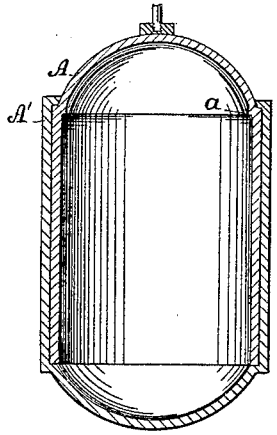
Figure 3:
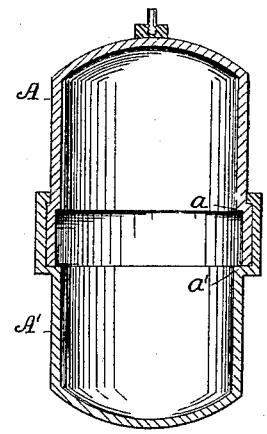

In the drawings, Figures 1, 2, 3, 4, 5, and 6 represent in vertical central section floats constructed according to my invention and illustrate various modifications in the form of certain of the parts. Fig. 3 represents the preferred form.

To successful floats three things are necessary—buoyancy, strength, and durability, which has special reference to the tightness and permanency of the joints. Beyond tightness and durability the value and efficiency of a float depend almost wholly upon its buoyancy, as it is by this power that it does its work. A float might be made tight and durable without being practical if heavy, and hence lacking in buoyancy. It follows, therefore, that the lighter the float can be made, and at the same time retain sufficient strength for the purpose for which it is used, the better it will be for all practical purposes. It also follows that a smaller float, when sufficiently light, may perform the same work as a larger one with less buoyancy in proportion to its size, and that this being true the efficiency of the float is not only increased, but the cost is considerably decreased, not only on account of dispensing with certain parts, but on account of being able to use a smaller float and smaller containing case or chamber for the same for the same purpose for which larger floats in larger cases have previously been necessary.

To secure a tight joint and at the same time retain the strength of the metal has been the chief obstacle to making practical floats in the past. The processes formerly followed of soldering or brazing the joints were extremely difficult and impractical for reasons set forth in my patent, No. 340,534, dated April 20, 1886. Previous to that invention I believe no float had ever been made without either soldering or brazing, and I believe myself to have been the first to make floats without using either of these objectionable processes.

As ordinarily constructed floats are made by joining the parts, which in the past have been simply interlocked sufficiently to prevent their falling apart while in process of soldering or brazing the edges at the joint, whereby the float is intended to be made tight. This soldering of the float, which of course is accomplished by means of heat, expands the air within, causing an outward pressure through the molten solder or spelter, which makes fine blow-holes, which, although too small to be visible, cause the float to leak when subjected to pressure, or, in other words, to receive steam, water, or other liquid in which the float may be used, by which process it is of course robbed of its buoyancy and rendered inoperative and useless. While these floats have been interlocked the interlocking itself has never been supposed or intended to form a tight joint, or, in fact, any part of the joint so far as tightness is concerned, the interlocking simply being done to hold the parts in position for the convenience of the operator in making the joint by means of solder or spelter.

Floats made in the ordinary manner have been extremely unsatisfactory for other reasons than that stated above. When in use, which is chiefly under steam-pressure, the parts are expanded and contracted by heat and cold, and obviously the expansion or contraction of the metal of which the shell is made and of the solder of which the joint is made, being different metals, is unequal, and there is a tendency to break or open the joint, causing the float to soon leak, when it at once becomes useless for the purpose intended, being robbed of its buoyancy. Another cause of trouble is popularly supposed to be galvanic action on these different metals used in making floats of the ordinary construction and likewise chemical action of various kinds of water and other liquids upon the solder, causing it to be honeycombed and the float to leak, with the effect above described.

In my patent, No. 340,534, above referred to, both soldering and brazing are dispensed with; but the joint is made largely by means of an internal ring, which I now propose to dispense with and to make the joint without the aid of an internal ring or other auxiliary parts, or, in other words, by means of the form of the parts of the shell itself, and thereby to not only use less material and less labor, and thus cheapen the construction of the float, but greatly lighten its weight, thereby proportionately increasing its buoyancy and efficiency, while securing the advantage of an unsoldered joint, and at the same time securing for the float increased strength by reason of compressed air, which is obtained by forcing the parts together. To accomplish these results, I form the parts of the floats so that one will enter within the other, but with a very tight fit, so that the parts when forced or spun together will conform to each other, so as to make a tight joint with or without any cement substance. I also, when extra strength is required, give the parts of the shell such conformation by flanges, shoulders, or corrugations transverse to the axis of the shell as will constitute in effect arches or bridges in the line of construction, and thus increase the resistance of the shell to pressure and at the same time extend the contact-surface of the joint, thereby increasing its efficiency. To effect the compression of the air within the shell and facilitate the putting of the parts together, I prefer to coat the surface of contact in the joint of one or both shells with some substance which while acting as a lubricant will also act as a cement when the parts have been completely forced together and the joint completed. The joint is made chiefly by firm contact, and is dependent for its strength and durability largely upon the extent of contact-surface. For many purposes, such as use in tanks where little or no external pressure is used, this joint may be made short and plain with comparatively little contact-surface and at the same time remain tight, or, in other words, be a perfect joint for the purpose intended, while for other purposes where high pressure is used this joint must be longer and have greater contact-surface and, perhaps, flanges, shoulders, or corrugations, as indicated above, for the purpose of giving greater surface of contact and at the same time strengthening the shell. For many purposes for which floats are used it is desirable to thus construct the float to a greater or less extent, and also to spin down the outer part into such corrugations and over such flanges and shoulders in order to strengthen it and make a more perfect joint; but there are other purposes—such as use in open air—in which it may not be necessary to utilize these corrugations, shoulders, or flanges, or to even spin down the outer part, the friction or forced contact being of itself sufficient to make a tight joint.

In carrying out my invention I proceed as follows: Having formed the parts of the shell so that one shall fit more or less tightly within the other to the desired distance and with or without such offsets, shoulders, or corrugations as the intended use of the float may seem to require, I spin or force the parts together by means of hydraulic or other suitable power until they are in firm contact, when, if the use of the floats seems to so require, the outer shell is extended down over the shoulders or offsets and into any corrugations of the inner shell. The forcing of the shells together has the effect of compressing the inclosed air, owing to the tight fit of the joint. Nevertheless a portion of the inclosed air will usually escape unless a lubricant or cement substance or its equivalent is used upon the surface of one or both of the parts while they are being forced together. I therefore preferably coat the surface with some insoluble compound, which, although mostly forced out by reason of the tightness of the joint, will fill any inequality in the surface of the joint, should it exist, and thereby not only facilitate the putting of the parts together and have the effect of retaining the air and preventing its escaping, but will, when hardened by time, resist the entrance of steam, water, or other liquid from the outside.

Figure 4:
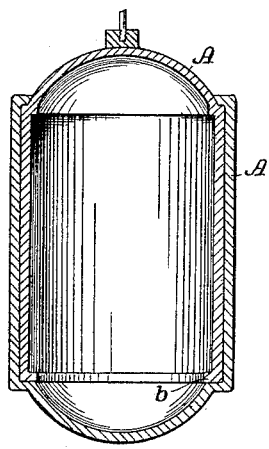
Figure 5:
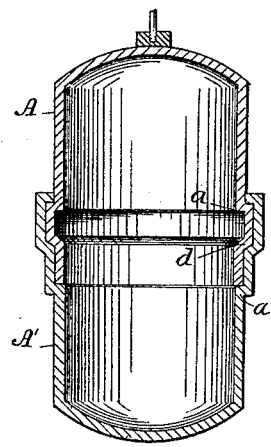
Figure 6:
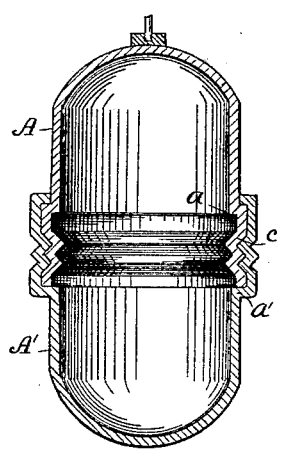

Referring to the drawings, A and A' represent the two parts of the shell, made to fit tightly one within the other, as described, A being the inner and A' being the outer part in all the figures. For floats not to be subjected to pressure—such, for instance, as floats used in the open air—the form shown in Fig. 1, in which the parts are simply spun or forced together by pressure, is quite sufficient. For use under slight or moderate pressure I give further security to the joint by spinning down the edge of the outer shell over the top of the inner one, or, preferably, into a slight shoulder $a$, formed in the inner shell, as shown in Fig. 2. Still further strength I obtain in the same form of float by making an inward-projecting flange $b$ on the edge of the inner shell, as shown in Fig. 4. In all of the floats shown in Figs. 1, 2, and 4 it will be observed that a double thickness of metal in absolutely close contact is employed over the whole cylindrical surface of the floats, giving great strength to the sides, while the shape of the ends is such as to offer great resistance to external pressure. The extra thickness of metal, however, adds somewhat to the weight of the float, and to decrease this in cases where a lighter float is required I form the shoulder *a* on the inner shell near its edge instead of at the top, as shown in Fig. 3, and form a shoulder *a'* on the outer shell, against which the edge of the inner shell is forced, and spin down the edge of the outer shell over the shoulder *a*, as in Fig. 3. This makes a tightly-locked joint, and the raised shoulders *a a'* constitute a bridge-like arch of metal, offering great resistance to external pressure on the float, and by turning in a flange on the inner shell, such as shown at *b* in Fig. 4, still greater strength may be given to the joint shown in Fig. 3. For the purpose of securing greater strength and increasing the contact-surface of the joint shown in Fig. 3 it is desirable in some cases to form one or more offsets *d* in the inner shell between the shoulder *a* and the edge of the shell and to conform the outer shell to this, as shown in Fig. 5, and where the contact-surface requires to be still more extended or to have still greater strength a series of corrugations *c* may be employed instead of the offset *d*, the outer shell being spun down into these corrugations, as shown in Fig. 6.

What I claim as my invention, and desire to secure by Letters Patent, is—

1. A float composed of a shell having its parts joined by interlocking the same without internal or auxiliary parts and without soldering, substantially as described.

2. A float composed of a shell the parts of which fit tightly one within the other to form the joint and joined without internal or auxiliary parts by forcing, spinning, or shrinking the outer part over and upon the inner one, substantially as described.

3. A float composed of a shell the parts of which fit tightly one within the other to form the joint and joined without internal or auxiliary parts by forcing, spinning, or shrinking the outer part upon the inner and over shoulders or offsets formed thereon, substantially as described.

4. A float composed of a shell formed in parts, one fitting tightly within the other for a portion of its length to form a joint, and provided with offsets or corrugations to which the outer overlapping part is made to conform by spinning or forcing down the substance of the outer shell when joined into intimate contact with the inner, substantially as described.

5. A float composed of a shell the air within which is compressed and the parts interlocked by forcing the parts of the shell together and spinning or pressing the outer part over the inner one or into corrugations therein, substantially as described.

6. A float composed of a shell formed in parts fitting tightly one within the other and forced together, with a lubricating or cementing substance between them to secure compression of the air within the shell and perfect the joint, substantially as described.

7. In a hollow metallic float composed of a shell formed in parts without internal or auxiliary parts, an interlocked joint formed by forcing the edge of the inner part against a shoulder formed on the outer part and forcing or spinning the edge of the outer part over a shoulder formed on the inner part, substantially as described.

8. In a hollow metallic float formed in parts and joined by an interlocking joint, corrugations formed in one or more of the parts to strengthen the float and perfect the joint, substantially as described.

9. In a hollow metallic float formed in parts and joined by an interlocking joint, the offsets *d*, formed on one or more of the parts to strengthen the float and perfect the joint, substantially as described.

In testimony whereof I hereto affix my signature in presence of two witnesses.

ALLEN J. WRIGHT.

Witnesses:
 W. H. NEWTON,
 L. PRENTISS.